United States Patent [19]

McRae et al.

[11] Patent Number: 5,161,408
[45] Date of Patent: Nov. 10, 1992

[54] PHOTO-ACOUSTIC LEAK DETECTION SYSTEM AND METHOD

[76] Inventors: Thomas G. McRae, 2751 Ryan Blvd., Punta Gorda, Fla. 33950; Alan H. Dewey, 5943 SW. County Rd., 761, Arcadia, Fla. 33821

[21] Appl. No.: 749,910

[22] Filed: Aug. 26, 1991

[51] Int. Cl.⁵ .............................................. G01M 3/20
[52] U.S. Cl. .................. 73/40.7; 73/40.5 A; 73/592; 250/334
[58] Field of Search .................. 73/40.5 A, 40.7, 49.3, 73/49.2, 24.01, 24.02, 592; 340/605; 250/330, 336.1, 334

[56] References Cited

U.S. PATENT DOCUMENTS

| | | | |
|---|---|---|---|
| 3,925,666 | 12/1975 | Allan et al. | 73/49.2 X |
| 4,457,162 | 7/1984 | Rush et al. | 73/24.01 |
| 4,555,627 | 11/1985 | McRae et al. | 250/334 |
| 4,772,789 | 9/1988 | Maram et al. | 250/330 |

FOREIGN PATENT DOCUMENTS

| | | | |
|---|---|---|---|
| 868389 | 9/1981 | U.S.S.R. | 73/40.7 |
| 1281947 | 1/1987 | U.S.S.R. | 73/40.7 |

Primary Examiner—Hezron E. Williams
Assistant Examiner—Joseph W. Roskos
Attorney, Agent, or Firm—Frank A. Lukasik

[57] ABSTRACT

An apparatus and method for the rapid detection and location of a gas leak. A collimated beam of light is scanned across the component under test which has been pressurized with a tracer gas that strongly absorbs the light. When the light passes through the gas emerging from the source of the leak, the light energy absorbed by the gas produces an acoustic emission which is detected by a microphone. The resulting signal may be processed either as an alarm to notify the operator that a leak is present, or, it may be processed in coordination with the beam scanning mechanism to indicate exactly where the leak is located on the component.

13 Claims, 3 Drawing Sheets

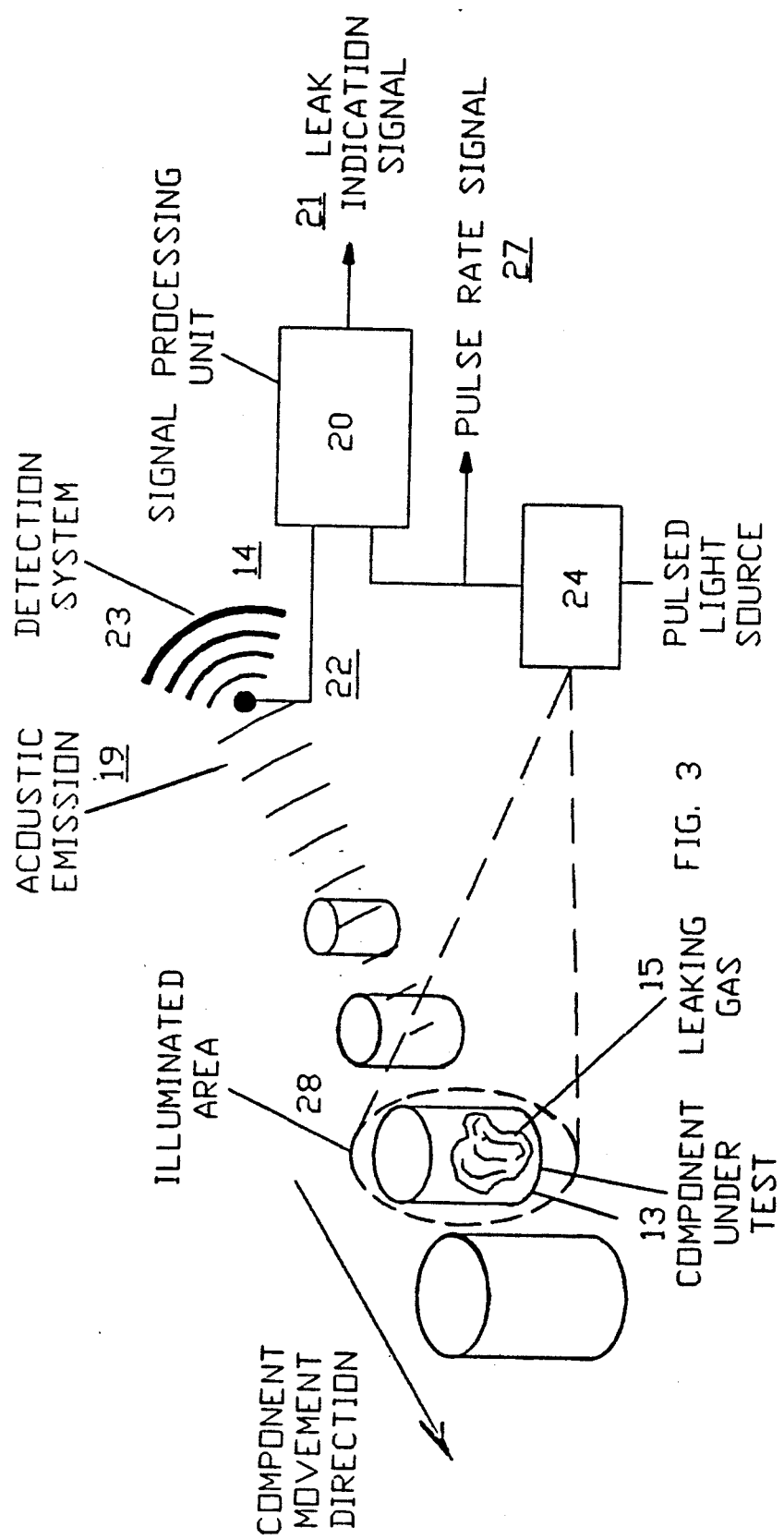

PHOTO-ACOUSTIC LEAK DETECTION SYSTEM AND METHOD

BACKGROUND OF THE INVENTION

1. Field of the Invention

The present invention relates to gas leak alarm and location generally, and more specifically, the invention is directed to an apparatus and method for leak-checking of gas or liquid-tight components on a production line or in the field.

2. Discussion of the Prior Art

The leak testing of compressors, heat exchangers, fuel tanks, fuel and hydraulic lines, pressure vessels, and window and door seals, etc., is an important manufacturing consideration in many different industries. In many cases, the gas-tight or liquid tight integrity of these components and/or systems is usually determined by some form of a pressure-decay test. With this technique, the unit under test is injected with air to some specified overpressure, and the pressure is monitored for a specified time period. If the pressure does not decay below a specified value at the end of the designated time period, the component under test is considered to be leak-free. This is a very simple, cost-effective leak checking method, and it is used for production line leak checking whenever possible. However, the pressure-hold method is essentially a yes/no leak tight test in that it only indicates to the operator whether or not the unit has a leak—it does not tell him the leak location. Furthermore, for large components with small leaks, a lengthy time period is required. The procedure is also affected by any temperature changes which may occur during the monitoring period.

A more sensitive technique involves drawing a vacuum on the component and then completely surrounding it with helium gas. A detector inside the vacuum system notifies the operator if helium is present in the air being pumped from the component. This technique is capable of detecting leaks as small as $10^{-9}$ scc/sec, but is very expensive to set-up and to maintain, and as with the pressure-decay technique, does not indicate the location of the leak.

Generally, components which fail the pressure-decay or helium leak tests are rejected from the production process and submitted to some form of leak location testing. Pressurization/immersion, pressurization/soaping, ammonia-sensitive paint and tracer gas injection/detection, are the most common industrial techniques currently being used to pinpoint leak sources.

The pressurization/immersion technique consists of pressurizing the component, totally immersing it in water or some other clear liquid, and observing the point of bubble emergence. This technique works quite nicely in situations involving small components which are not adversely affected by liquid immersion. However, the technique does usually require some post-test clean-up and/or drying procedure. This technique is capable of locating leaks as small as $10^{-4}$ scc/sec with proper lighting, use of low surface tension liquids, and if adequate viewing time is allowed. It is a very labor intensive, time consuming method which requires extreme worker concentration for long periods of time. It is a leak location technique which does not very easily lend itself to automation.

Pressurization/soaping is another leak location technique which is generally used to locate leaks from components or larger complex systems where total immersion is not practical. In this technique, the leaky component is pressurized with air, painted or sprayed with a thin viscous liquid (usually soap), and observed for the presence of bubbles which indicate the leak location. This technique requires that the liquid soap be placed on the leak, and observed for bubble formation before it either evaporates or flows away. It is somewhat more labor intensive technique than pressurization/immersion and always requires post-test clean-up. Experienced technicians say they can locate leaks as small as $10^{-3}$ scc/sec with this technique, making it about 10 times less sensitive than the pressurization/submersion technique.

With the pressurization/ammonia-sensitive painting technique, the component is coated with a water soluble, ammonia-sensitive paint, a small amount of liquid ammonia is injected into the component, it is sealed and pressurized with air. The ammonia/air mixture emerging from the leak produces a discoloring of the special paint, thus pin-pointing the location of the leak. This technique is quite expensive, involves the use of a toxic material (ammonia), and requires extensive post-test cleanup. However, it offers complete coverage of the component and is quite sensitive. According to the paint manufacturer, an observer can see paint discoloration within one minute at a distance of 5 meters produced by a 10 micron diameter pinhole leak pressurized to 1.3 atm (5 psig). Under the same conditions, a 30 micron pinhole leak will produce a 6 mm diameter discoloration within one minute. These leak rates are estimated to be in the $10^{-3}$ scc/sec range.

The tracer gas injection/detection technique involves pressurizing the component with a tracer gas, usually helium (He) or a chlorofluorocarbon (CFC), and surveying the exterior with a sensitive sniffer-type detector. This technique is extremely sensitive, capable of locating leaks as small as $10^{-6}$ scc/sec if the intake of the sniffer is placed directly over the source of the leak. Drawbacks to the He approach are the cost of the gas and the detection system; however, this technique is relatively free of background gas false readings. On the other hand, the cost of the CFC gas and detectors is quite reasonable, but these sniffers are affected by a host of common background gases, and are currently being phased out as tracer gases for their adverse affect on the environment. Furthermore, with this technique, location of small leaks can be masked by the presence of a large leak located nearby.

The instant invention involves a physical process commonly known as the photo-acoustic effect, which is used in various forms as a gas detection technique. For example, U.S. Pat. No. 4,516,858 to Gelbwachs, describes an apparatus in which a laser beam is distributed to a number of photo-acoustic cells via fiber optic cables for the purpose of monitoring hazardous gas concentrations at multiple sites.

U.S. Pat. No. 4,557,603 to Oehler et al, discloses an apparatus for the selective detection of a variety of gases using the photo-acoustic effect. In this case, a monochromator is used to vary the wavelength of the light introduced to a photo-acoustic cell which contains the gas to be analyzed.

U.S. Pat. No. 4,622,845 to Ryan, et al, discloses an apparatus using a pulsed infrared light source and an acousto-optic tunable filter to provide illumination of a photo-acoustic cell containing a gas sample extracted from the environment.

In all of the above inventions, the gas to be detected must be introduced into a photo-acoustic cell which is then irradiated with pulsed or modulated light which is spectrally selected to be strongly absorbed by the gas within the cell. The purpose of all of the above mentioned inventions is for concentration measurements of the gases of interest.

In an article entitled "Photo-acoustic detection and ranging a new technique for the remote detection of gases", Brassington, J. Phys. D: Appl. Phys., volume 15, page 219, 1982, an apparatus is described for determining the presence and range to a gas source using a pulsed laser and a microphone detector. The distance to the gas source, or range along the line-of-sight of the pulsed laser beam, is determined from the delay in receiving the acoustic pulse generated when the laser light is absorbed by the gas of interest. This technique requires a pulsed laser, and is not capable of rapidly determining the precise source of gas leaks.

SUMMARY OF THE INVENTION

The invention provides a method and apparatus for the detection and location of leaks which may exist in supposedly gas-tight or liquid-tight components and/or systems. The invention is based on the photo-acoustic (PA) effect which occurs when a gas absorbs light. When the wavelength of the light coincides with an absorption line of the gas, the energy absorbed produces temperature and pressure increases in the gas. If the energy absorbed is of sufficient magnitude, a pressure, or acoustic, wave is generated which may be detected by a pressure transducer, such as a microphone. The invention is comprised of a continuous-wave (CW) laser beam, or other well collimated beam of light, which is rapidly scanned across the component to be leak tested. The component under test is pressurized with a gas which strongly absorbs the scanned light beam. If a leak occurs, the emerging gas absorbs the light as it passes through it, and produces an acoustic emission which is then detected by a microphone or similar detector. The resulting signal may then be used to notify the operator that a leak is present. Furthermore, if the scanning of the light beam across the component under test is in a repeatable pattern, the resulting acoustic signal can be used to indicate the location of the leak on the component. This invention will be a valuable addition to the Backscatter Absorption Gas Imaging system of U.S. Pat. No. 4,555,627.

Accordingly, it is a principal object of the invention to provide a new and improved leak detection and location process and apparatus.

It is another object of the invention to provide a process that will quickly notify the operator that a component or system has a leak.

Another object of the invention is to quickly show the operator the location of a leak in a component under test.

Still another object of the invention is to provide a method and apparatus for the detection and location of leaks by scanning the component under test with a collimated beam of light and detecting a resulting acoustic signal.

These and other objects of the invention will become apparent to those skilled in the art to which the invention pertains when taken in light of the annexed drawings.

BRIEF DESCRIPTION OF THE DRAWINGS

FIG. 3 is a diagram of a leak alarm-only system of the invention.

DESCRIPTION OF THE PREFERRED EMBODIMENT

Figure 1:
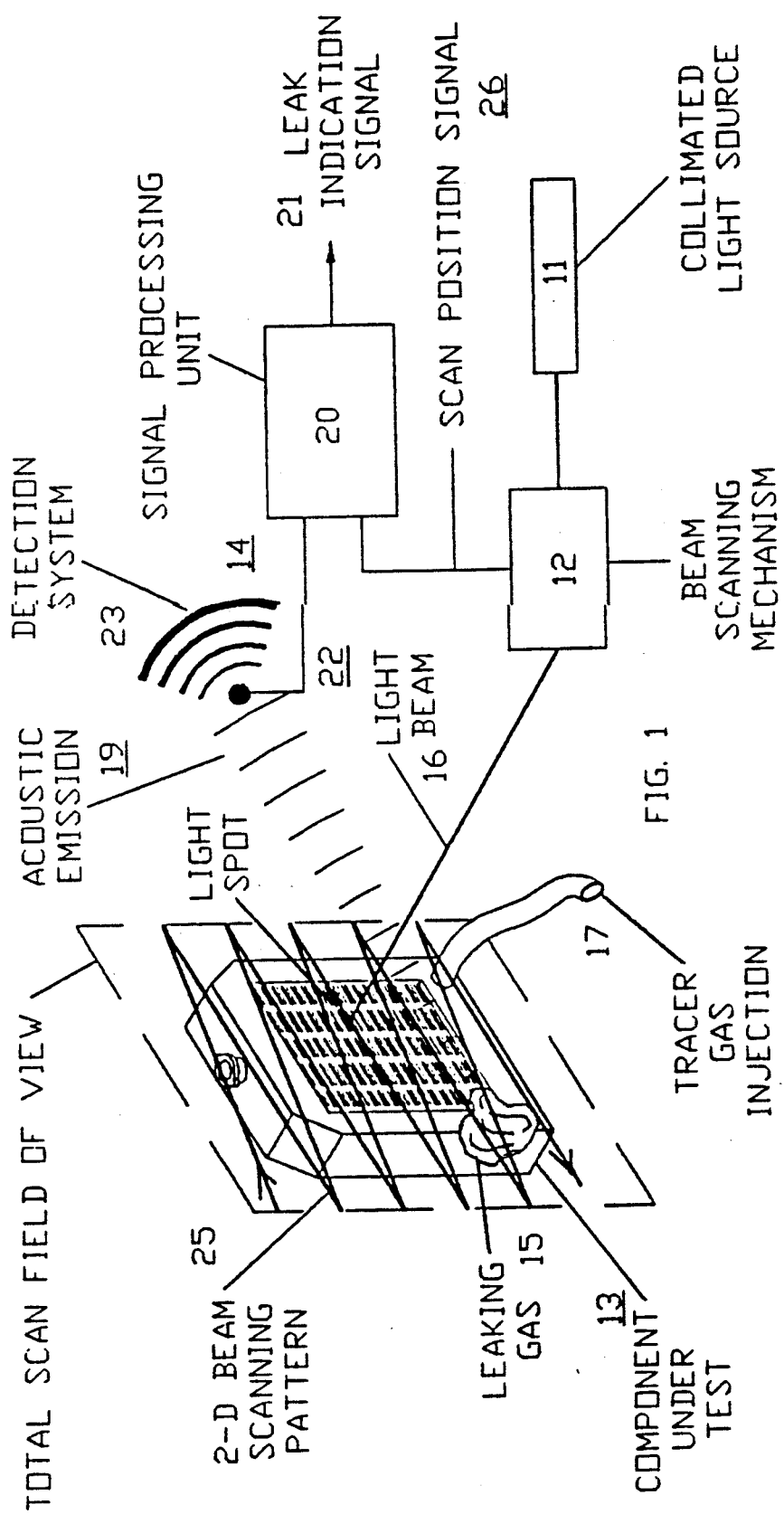
FIG. 1 shows the primary components of a two-dimensional photo-acoustic leak location/alarm (PALLA) system of the invention.

The invention is a method and apparatus for detecting the presence and the location of a gas leak. The invention comprises a collimated light source 11 and a beam scanning mechanism 12 which irradiates the leaking component 13 and an acoustic detection system 14 to detect the acoustic waves generated by the leaking gas 15 upon the absorption of the light beam 16. The resulting signal may be used to notify the operator that the component has a leak, or if coordinated with the light beam scanning pattern, may be used to determine the location of the leak on the component 13 under test.

A block diagram showing the major components of a PALLA system is shown in FIG. 1. A collimated light beam 16, such as a laser beam, is scanned across the component 13 under test by a beam scanning mechanism 12. The component 13 has been injected with a tracer gas 17 which strongly absorbs the wavelength of the light beam 16. If the component 13 has a leak, the leaking gas 15 will absorb the scanned light as it passes through the gas 15. The absorption of the light energy results in a momentary and local pressure disturbance within the leaking gas 15 which propagates away in all directions, generally as an acoustic emission 19. The frequency(s) of this acoustic emission 19 will depend on the frequency(s) of irradiation of the leaking gas 15 by the scanning light beam 16. This acoustic emission 19 is detected by an acoustic detection system 14 and processed by a signal processing unit 20. The resulting leak indication signal 21 may then be used as an alarm to notify the operator that the component 13 has a leak, and/or to aid the operator in locating the source of the leak.

The embodiment of FIG. 1 shows a two-dimensional scanning PALLA system which may be used for either leak alarm or leak location situations. A collimated light source 11, for example, the light beam from a $CO_2$ laser operating at a wavelength of 10.5514 microns, is introduced to a raster scan mechanism 12. The beam scanning may be accomplished by any number of standard techniques such as a two-axis scan mirror arrangement, a two-axis rotating polygon arrangement, holographic scanners, acousto-optic scanners, electro-optic scanners, pan and tilt mountings, or a combination thereof. The component 13 under test is positioned so as to be fully enveloped by the total 2-dimensional scan field-of-view, or so as to pass through the total scan field-of-view 25. The component 13 is pressurized with a tracer gas 17, such as sulfur hexaflouride ($SF_6$), which strongly absorbs the 10.5514 micron light. If a leak is present, the acoustic emission produced by the absorption of the laser light 16 by the $SF_6$ gas 15, is detected by a sensitive microphone 22 and parabolic reflector 23 arrangement which is aimed at the component 13 under test. The signal from the microphone 22, along with scan positioning signals 26 from the beam scanning mechanism 12, are submitted to the signal processing unit 20. Careful attention must be paid so as to eliminate background acoustical noise, so use of the beam scan frequency and position signals 26 in the signal processing unit 20 is essential. Standard practices for extracting the acoustic signal 21 from the background acoustic noise(s), such as tuned microphones, acoustical filtering, lock-in detection and amplification, digital signal processing, or combinations thereof, are used in the signal processing unit 20 to generate the appropriate leak indication signal 21.

In its simplest application, the embodiment of FIG. 1 would be used as a leak alarm system, in which the exact location of the leak within the total scan field-of-view is not required. However, due to the two-dimensional nature of the beam scan pattern, the exact location of the leak can also be determined by a number of different techniques. The simplest leak location technique consists of manually blocking, or shadowing, the light beam irradiation of the component by positioning a small area disc between the PALLA system and the component. As this blocking disk is passed over the component 13, it interrupts the light beam from irradiating a small area on the component 13. If the blocking disk shadows a region of the total scan field-of-view where no gas is present, then the acoustic signal will still be detected. However, as the disk is positioned so as to block the light beam 16 irradiation of that region within the total scan field-of-view where the gas is present, the acoustic emission 19 will cease, notifying the operator that he has successfully pinpointed the leak source. This same leak location technique, i.e. local shadowing of the component 13 under test, may also be accomplished internal to the PALLA system by systematically modulating or chopping the light beam 16 at different positions of the total scan field-of-view while simultaneously noting the acoustic emission signal 19. In this manner, the horizontal and vertical position within the total scan field-of-view corresponding to the reduction, or loss, of the acoustic signal indicates the location of the leak.

A second, relatively simple method of determining the location of a leak within the total scan field-of-view would be to temporarily reduce the scan area, or zoom-in the field of view, and then manually or automatically direct this reduced scan area to various points on the component under test until the acoustic emission signal 19 is maximized.

Figure 2:
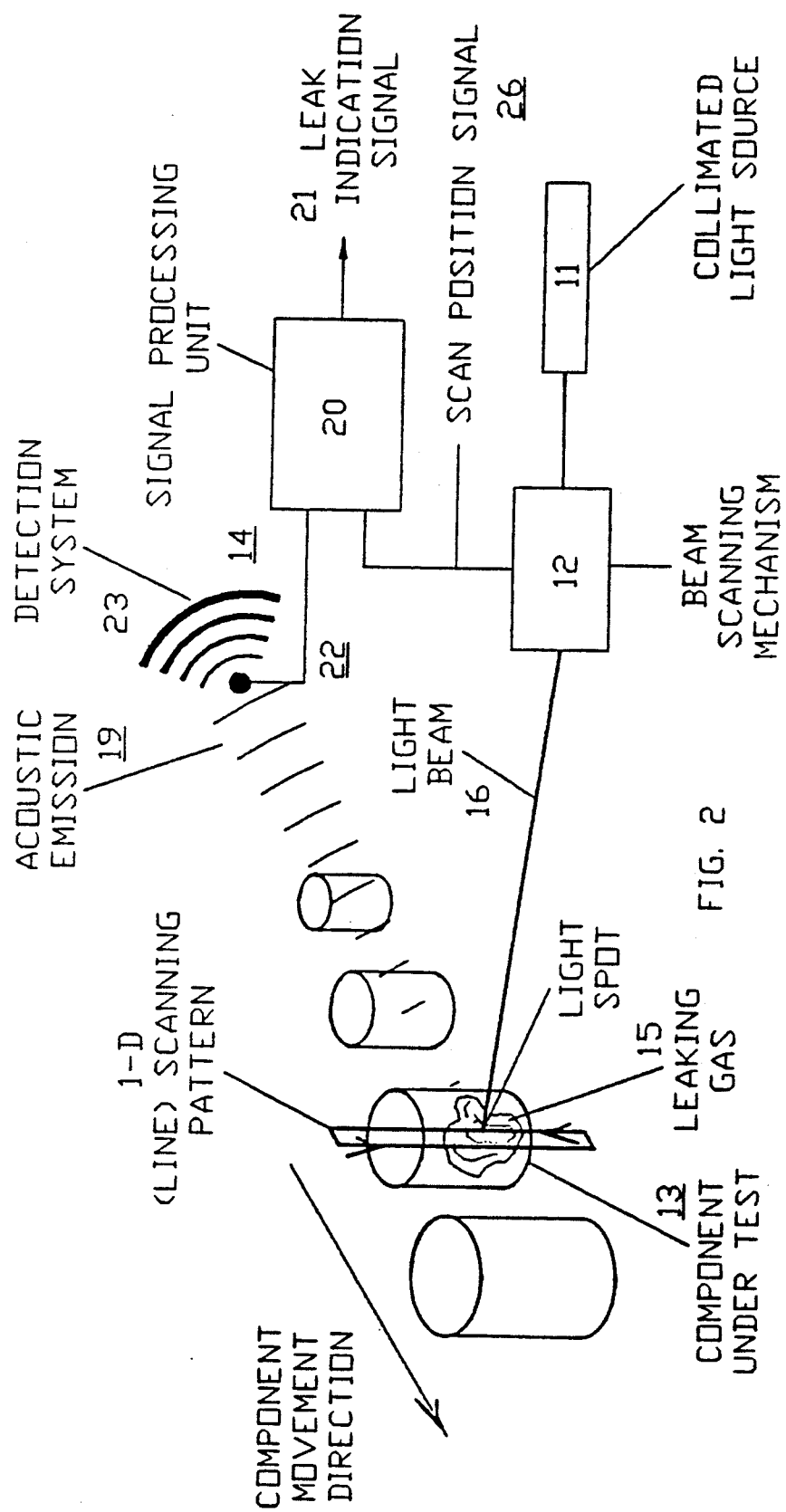
FIG. 2 is a diagram of a one-dimensional PALLA system of the invention.

Another embodiment shown in FIG. 2 shows a one-dimensional version of the PALLA system which may also be used as a leak alarm and/or leak location system. In this embodiment, the collimated light beam 11 is scanned in one direction only, i.e., a line, while crosswise motion of the component under test, which has been pressurized with the tracer gas 17, provides complete coverage for leak detection purposes. As with the embodiment of FIG. 1, processing of the acoustic emission signal 19 can be such as to allow for the simple alarm mode of operation, or correlated with the line scan position signal 26 and component 13 cross-wise movement to provide leak location information.

The embodiment of FIG. 3 is used as a leak alarm system only. In this embodiment, a pulsed light source 24, is focused to illuminate an area 28 slightly larger than the component 13 under test. The component 13 is pressurized with a tracer gas 17 which strongly absorbs the light source 24 radiation. If a leak is present, the tracer gas 17 absorbs the light, producing an acoustic emission 19 which is in tune with the pulse rate of the light source 24. This acoustic emission 19 is detected by the acoustic detection system 14, and making use of the light source pulse rate signal 27, is processed into a leak indication signal 21 which may be used as an alarm to notify the operator that the component 13 under test has a leak.

Two embodiments of a Backscatter Absorption Gas Imaging (BAGI) System which would accomplish the two-dimensional raster scan of a laser beam across the component under test are shown in U.S. Pat. No. 4,555,627 to McRae, a joint inventor of the instant invention. The synchro-scan mechanism is a modification of a conventional IR imager, e.g., the Inframetrics, Inc. Model 500L Fast Scan IR Thermal Imager, and is currently used in the Laser Imaging Systems (LIS) Gas Vue leak location systems.

While the invention has been explained with respect to a preferred embodiment thereof, it is contemplated that various changes may be made in the invention without departing from the spirit and scope thereof. Changes and modifications of the specifically described embodiments can be carried out without departing from the scope of the invention and is intended to be limited only by the scope of the appended claims.

What is claimed:

1. Apparatus for rapid detection and/or location of a gas leak emerging from a gas-tight or liquid-tight component under test comprising:

a light source for providing a collimated light beam at a wavelength strongly absorbed by the leaking gas, beam scanning means optically aligned with said light source for scanning said light beam across said component under test in a predetermined pattern and for providing a scan positioning signal output, acoustic detection means for detecting acoustic waves generated by said gas leak upon absorption of said light beam and for producing an electrical signal proportional to the acoustic emission, and signal processing means connected to said beam scanning means and said acoustic detection means for extracting the gas leak acoustic emissions from background acoustic emissions and generating a leak indication signal.

2. Apparatus according to claim 1 wherein said gas leak consists of sulfur hexaflouride injected into the component under test.

3. Apparatus according to claim 1 wherein said light source comprises a laser.

4. Apparatus according to claim 3 wherein said laser comprises a $CO_2$ laser operating at a wavelength of 10.5514 microns.

5. Apparatus according to claim 1 wherein said component under test is positioned so as to be fully enveloped by a two-dimensional, raster-type scan of said light beam.

6. Apparatus according to claim 5 wherein said light beam and beam scanning are provided by a backscatter absorption gas imaging (BAGI) system.

7. Apparatus according to claim 1 wherein said component under test is positioned to be scanned by said light beam in one dimension with cross-wise motion of said component providing complete coverage for leak detection.

8. Apparatus according to claim 1 wherein said light source comprises a pulsed light source focused to illuminate an area slightly larger than said component under test and said acoustic emission is in tune with the pulse rate of said light source.

9. Apparatus for rapid detection and location of $SF_6$ tracer gas leak emerging from a gas-tight or liquid-tight component under test comprising:

a $CO_2$ laser operating at a wavelength of 10.5514 microns, beam scanning means comprising a raster scan mechanism, optically aligned with said laser for scanning said laser across said component under test in a total field of view of said laser, and for providing a scan positioning signal output, acoustic detection means for detecting acoustic waves generated by said $SF_6$ tracer gas upon absorption of said laser beam, and for producing an acoustic emission signal, said detection means consisting of a sensitive microphone and a parabolic reflector arrangement, and signal processing means connected to said beam scanning means and said detection means for eliminating background acoustic emissions and generating a leak position indicating signal.

10. A method for detecting and/or locating a gas leak emerging from a gas-tight or liquid-tight component under test comprising the steps of:

injecting a tracer gas into said component under test, scanning a collimated light beam at a wavelength strongly absorbed by the tracer gas across said component in a predetermined pattern, and generating a beam position signal indicating the location of said light beam in a predetermined field of view, detecting acoustic emissions generated by said tracer gas upon absorption of said light beam, and processing said detected acoustic waves with relation to the beam position signals and providing leak indicating signals for indicating the existence and/or location of a leak.

11. A method according to claim 10 wherein said predetermined pattern consists of a two-dimensional scan pattern of said light beam.

12. A method according to claim 10 wherein said predetermined pattern consists of a cross-wise movement of said component and a one-dimensional scan by said light beam.

13. A method according to claim 10 wherein a pulsed light source is aligned so as to totally irradiate the component under test, producing acoustic emissions from said leaking tracer gas which are in tune with the pulse rate of said light beam.

* * * * *